United States Patent
Iizuka et al.

(10) Patent No.: US 10,096,946 B2
(45) Date of Patent: Oct. 9, 2018

(54) WIRE CONNECTION STRUCTURE HAVING A COIL-SHAPED CIRCUIT FORMED BY WIRE END PORTIONS AND A CONDUCTIVE MEMBER WOUND AROUND A RING-SHAPED MAGNETIC BODY

(71) Applicant: YAZAKI CORPORATION, Tokyo (JP)

(72) Inventors: Hayato Iizuka, Shizuoka (JP); Naoki Fujimoto, Shizuoka (JP)

(73) Assignee: YAZAKI CORPORATION, Tokyo (JP)

( * ) Notice: Subject to any disclaimer, the term of this patent is extended or adjusted under 35 U.S.C. 154(b) by 0 days.

(21) Appl. No.: 15/782,663

(22) Filed: Oct. 12, 2017

(65) Prior Publication Data
US 2018/0109040 A1   Apr. 19, 2018

(30) Foreign Application Priority Data
Oct. 14, 2016 (JP) .................. 2016-202955

(51) Int. Cl.
| | |
|---|---|
| *H01R 13/53* | (2006.01) |
| *H01R 13/658* | (2011.01) |
| *H01R 13/648* | (2006.01) |
| *B60R 16/02* | (2006.01) |
| *H01B 11/10* | (2006.01) |
| *H01F 17/06* | (2006.01) |
| *H01R 24/40* | (2011.01) |

(Continued)

(52) U.S. Cl.
CPC ....... *H01R 13/658* (2013.01); *B60R 16/0207* (2013.01); *H01B 11/1083* (2013.01); *H01F 17/062* (2013.01); *H01R 13/6485* (2013.01); *H01R 24/40* (2013.01); *H02G 3/0487* (2013.01); *H02G 3/088* (2013.01); *H02G 15/113* (2013.01); *H01B 7/17* (2013.01); *H01R 13/7193* (2013.01); *H02G 3/081* (2013.01)

(58) Field of Classification Search
CPC .. H01R 11/31; H01R 13/6205; H01R 13/658; H01R 24/40; H01R 11/30; H01R 13/6485; H01B 11/1083; H01F 17/062; H02G 3/0487; H02G 3/088; B60R 16/0207
USPC ........... 439/181, 275, 276, 38–40; 174/72 A; 361/111
See application file for complete search history.

(56) References Cited

U.S. PATENT DOCUMENTS

| | | | | |
|---|---|---|---|---|
| 4,217,619 A | * | 8/1980 | Tibolla ............... | H01R 13/6666 361/111 |
| 4,609,238 A | * | 9/1986 | Jamgotchian ......... | H01R 11/30 439/39 |

(Continued)

FOREIGN PATENT DOCUMENTS

JP   2012-174661 A   9/2012

*Primary Examiner* — Chandrika Prasad
(74) *Attorney, Agent, or Firm* — Kenealy Vaidya LLP

(57) ABSTRACT

A wire connection structure includes a ring-shaped magnetic body, a first wire having a first wire end portion which is inserted through the ring-shaped magnetic body from a first direction, a second wire having a second wire end portion which is inserted through the ring-shaped magnetic body from a second direction opposite to the first direction, and a conductive member which is disposed outside the ring-shaped magnetic body and has two end portions that are electrically connected to a conductor of the first wire end portion and a conductor of the second wire end portion respectively.

8 Claims, 11 Drawing Sheets

(51) Int. Cl.
*H02G 3/04* (2006.01)
*H02G 3/08* (2006.01)
*H02G 15/113* (2006.01)
*H01B 7/17* (2006.01)
*H01R 13/7193* (2011.01)

(56) References Cited

U.S. PATENT DOCUMENTS

| | | | | |
|---|---|---|---|---|
| 7,014,496 | B2* | 3/2006 | Shimirak | H01R 4/242 |
| | | | | 29/747 |
| 7,547,226 | B2* | 6/2009 | Koessler | H01R 4/2433 |
| | | | | 439/409 |
| 7,722,362 | B2* | 5/2010 | Frake | B29C 43/18 |
| | | | | 439/76.1 |
| 8,047,883 | B2* | 11/2011 | Montalbano | H01R 4/505 |
| | | | | 439/864 |
| 9,705,233 | B2* | 7/2017 | Yamada | H02G 3/16 |
| 9,767,972 | B2* | 9/2017 | Peng | H01H 1/5805 |
| 9,815,421 | B2* | 11/2017 | Yamaguchi | B60R 16/0207 |
| 2010/0099288 | A1* | 4/2010 | Hong | H01R 9/0518 |
| | | | | 439/274 |
| 2010/0304624 | A1* | 12/2010 | Montalbano | H01R 4/505 |
| | | | | 439/863 |
| 2015/0096802 | A1* | 4/2015 | Itani | B60R 16/0215 |
| | | | | 174/72 A |
| 2017/0366059 | A1* | 12/2017 | Iizuka | H02K 3/30 |

* cited by examiner

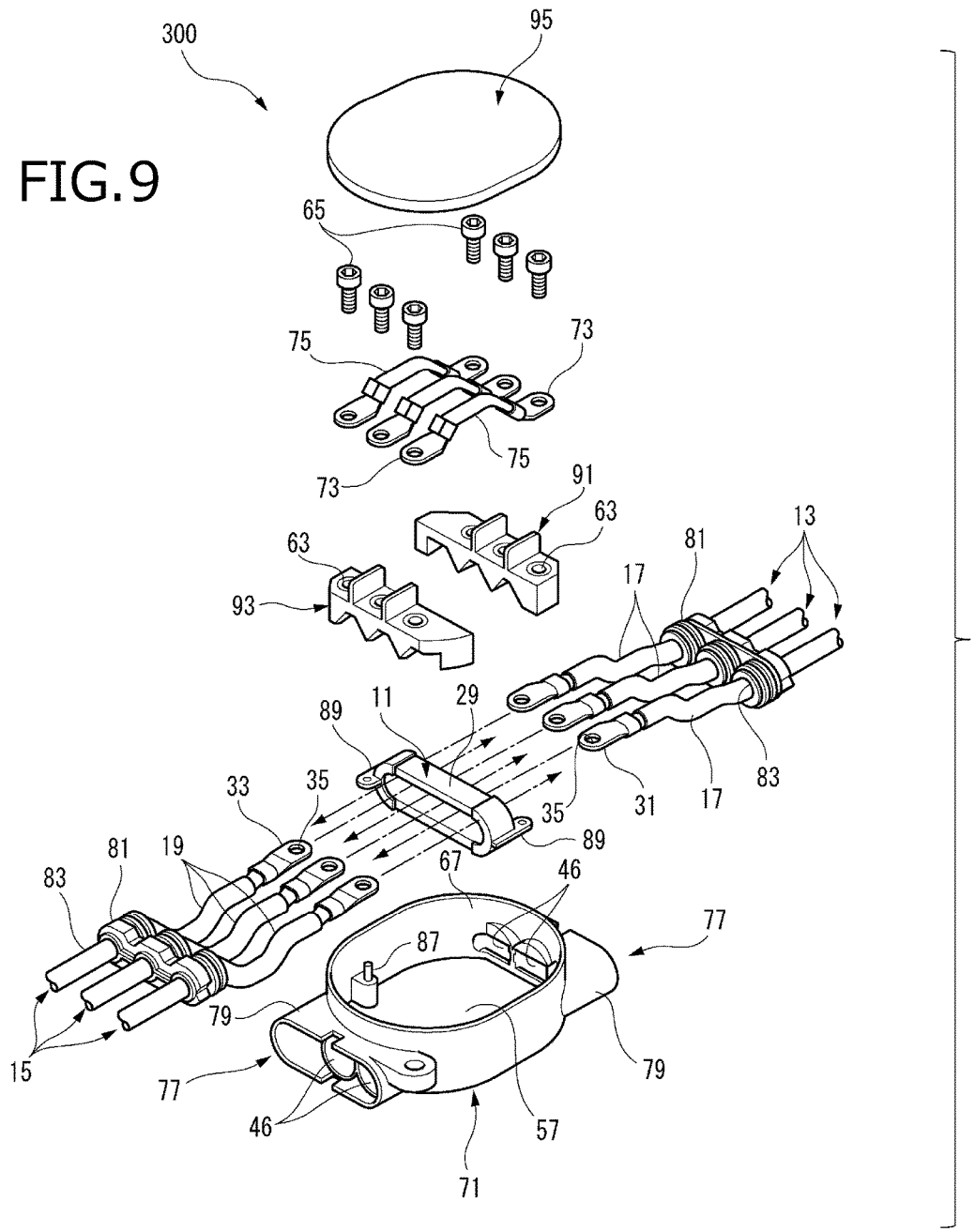

WIRE CONNECTION STRUCTURE HAVING A COIL-SHAPED CIRCUIT FORMED BY WIRE END PORTIONS AND A CONDUCTIVE MEMBER WOUND AROUND A RING-SHAPED MAGNETIC BODY

CROSS REFERENCE TO RELATED APPLICATIONS

This application is based on Japanese Patent Application (No. 2016-202955) filed on Oct. 14, 2016, the contents of which are incorporated herein by reference.

BACKGROUND OF THE INVENTION

1. Field of the Invention

The present invention relates to a wire connection structure having a surge suppressing effect and a noise reduction unit and a wire harness having the wire connection structure.

2. Description of the Related Art

In general, in electric vehicles, hybrid vehicles, etc., DC power of a battery or the like is converted into AC power by an inverter and a motor for rotating wheels and a motor generator (hereafter referred to generically as a "motor") are driven using the AC power. In inverters of this kind, since they convert DC power into AC power by switching the former at a high frequency, there may occur an event that high-frequency surge currents generated by the switching flow through the load motor. Various surge control methods for inverters have been proposed to prevent dielectric breakdown or the like of the motor by such surge currents.

For example, as shown in FIG. 11, JP-A-2012-174661 discloses a connector device 501 which is equipped with noise reduction coils. Among two power supply AC wires 505a and 507a and one ground wire 513 which are inserted through a cylindrical portion 503 of the connector device 501 and go out of one end surface of the cylindrical portion 503, the two power supply AC wires 505a and 507a are wound around two respective toroidal cores 509a which is disposed around (i.e., fitted with) the cylindrical portion 503. The cylindrical portion 503 is formed with grooves 511a in which the portions, wound around the toroidal cores 509a, of the power supply AC wires 505a and 507a are placed, respectively. Two through-holes 511b penetrate through the circumferential wall of the cylindrical portion 503, and AC wires 505b and 507b for power line communication which are connected to respective AC wires 505 and 507 inside the cylindrical portion 503 are inserted through the through-holes 511b to go out of the cylindrical portion 503.

In the connector device 501, noise reduction is attained by coils that are formed in such a manner that the power supply AC wires 505a and 507a which extend from the cylindrical portion 503 are wound around the respective toroidal cores 509a.

However, since the coils are formed by winding the wires (power supply AC wires 505a and 507a) around the ring-shaped magnetic bodies, the above conventional connector device 501 has a problem that its overall size is large because of a restriction relating to a minimum wire bending radius. In particular, as the wire diameter increases as in the case of high-voltage cables, the minimum wire bending radius becomes larger to make it difficult to install the connector device 501 in a vehicle. There is another problem that a winding process requires a number of steps.

SUMMARY OF THE INVENTION

The present invention has been made in view of the above circumstances, and an object of the invention is therefore to provide a wire connection structure that can reduce the number of steps of a winding process, does not cause a size increase of cores around which wires are wound, and can provide a high surge suppressing effect, as well as a noise reduction unit and a wire harness having such a wire connection structure.

The above object of the invention is attained by the following wire connection structures, noise reduction units, and wire harness:

(1) A wire connection structure including a ring-shaped magnetic body; a first wire having a first wire end portion which is inserted through the ring-shaped magnetic body from a first direction; a second wire having a second wire end portion which is inserted through the ring-shaped magnetic body from a second direction opposite to the first direction; and a conductive member which is disposed outside the ring-shaped magnetic body and has two end portions that are electrically connected to a conductor of the first wire end portion and a conductor of the second wire end portion respectively.

In the wire connection structure of item (1), the first wire end portion and the second wire end portion that are inserted through the ring-shaped magnetic body from the opposite directions are electrically connected to the two respective end portions of the conductive member which is disposed outside the ring-shaped magnetic body, whereby the connection portion of the first wire and the second wire forms a coil-shaped circuit that is wound around the ring-shaped magnetic body. Thus, it is not necessary to bend the wires to wind them around the ring-shaped magnetic body, which makes it possible to reduce the number of steps of a winding process and prevent the overall size of the wire connection structure from being increased because of a minimum wire bending radius.

(2) The wire connection structure according to item (1), further including a first terminal that is connected to the conductor of the first wire end portion and a second terminal that is connected to the conductor of the second wire end portion, and the first terminal and the second terminal are fastened to the two end portions of the conductive member respectively with bolts.

According to the wire connection structure of item (2), since the first terminal and the second terminal are connected to the two respective end portions of the conductive member by bolt fastening, high connection reliability can be attained even if the connection involves conductors that are different from each other in form and material.

(3) A noise reduction unit including the wire connection structure according to item (2) and a housing; and wherein the ring-shaped magnetic body, the first wire end portion, the second wire end portion, and the conductive member are housed in the housing and sealed in by sealing material.

According to the noise reduction unit of item (3), since the connection portion of the first wire and the second wire which forms a coil-shaped circuit is housed in the housing and sealed in, the waterproofness and impact resistance are increased.

(4) The noise reduction unit according to item (3), wherein the conductive member is a busbar, the first terminal and the second terminal are positioned and held by a bottom portion of the housing having a top opening, and the first terminal and the second terminal are electrically connected to each other by the busbar.

According to the noise reduction unit of item (4), since the conductive member is the (plate-like) busbar, the distance, from the ring-shaped magnetic body, of the portion, located outside it, of the busbar can be minimized, whereby the overall noise reduction unit can be reduced in height and size. Since the first terminal and the second terminal are positioned with respect to and held directly by, for example, respective terminal fixing stages (e.g., insert nuts) formed on the bottom portion of the housing, the positions of the surfaces for holding the first terminal and the second terminal do not vary with respect to the bottom portion. This increases the efficiency of insertion work when the first wire end portion and the second wire end portion are inserted through a first wire insertion portion and a second wire insertion portion of the housing, respectively, and the first terminal and the second terminal are positioned with respect to and held by the bottom portion.

(5) The noise reduction unit according to item (3), wherein the conductive member is a busbar and is positioned and held by a bottom portion of the housing having a top opening.

According to the noise reduction unit of item (5), since the conductive member is the (plate-like) busbar, the distance, from the ring-shaped magnetic body, of the portion, located outside it, of the busbar can be minimized, whereby the overall noise reduction unit can be reduced in height and size. Since the conductors of the first wire end portion and the second wire end portion are connected to the two respective end portions of the busbar which is positioned with respect to and held by the bottom portion of the housing, it is not necessary to press the busbar during connection work and hence the efficiency of assembling work is increased.

(6) A wire harness including the noise reduction unit according to any one of items (3) to (5).

According to the wire harness of item (6), surge voltages that may occur when a wire harness is used in an electric vehicle, a hybrid vehicle, or the like can be suppressed easily merely by inserting the above-described noise reduction unit in a wire harness at a proper position. Wires need not be bent to be wound around the ring-shaped magnetic body and hence the noise reduction unit can be attached easily.

The wire connection structures, the noise reduction units, and the wire harnesses according to the invention can reduce the number of steps of a winding process, does not cause a size increase of cores around which wires are wound, and can provide a high surge suppressing effect.

The invention has been described above concisely. The details of the invention will become more apparent when the modes for carrying out the invention (hereinafter referred to as embodiments) described below are read through with reference to the accompanying drawings.

BRIEF DESCRIPTION OF THE DRAWINGS

FIG. 9 is an exploded perspective view of a noise reduction unit having a wire connection structure according to a third embodiment of the invention.

DETAILED DESCRIPTION OF THE EXEMPLARY EMBODIMENTS

Embodiments of the present invention will be hereinafter described with reference to the drawings.

Figure 1:
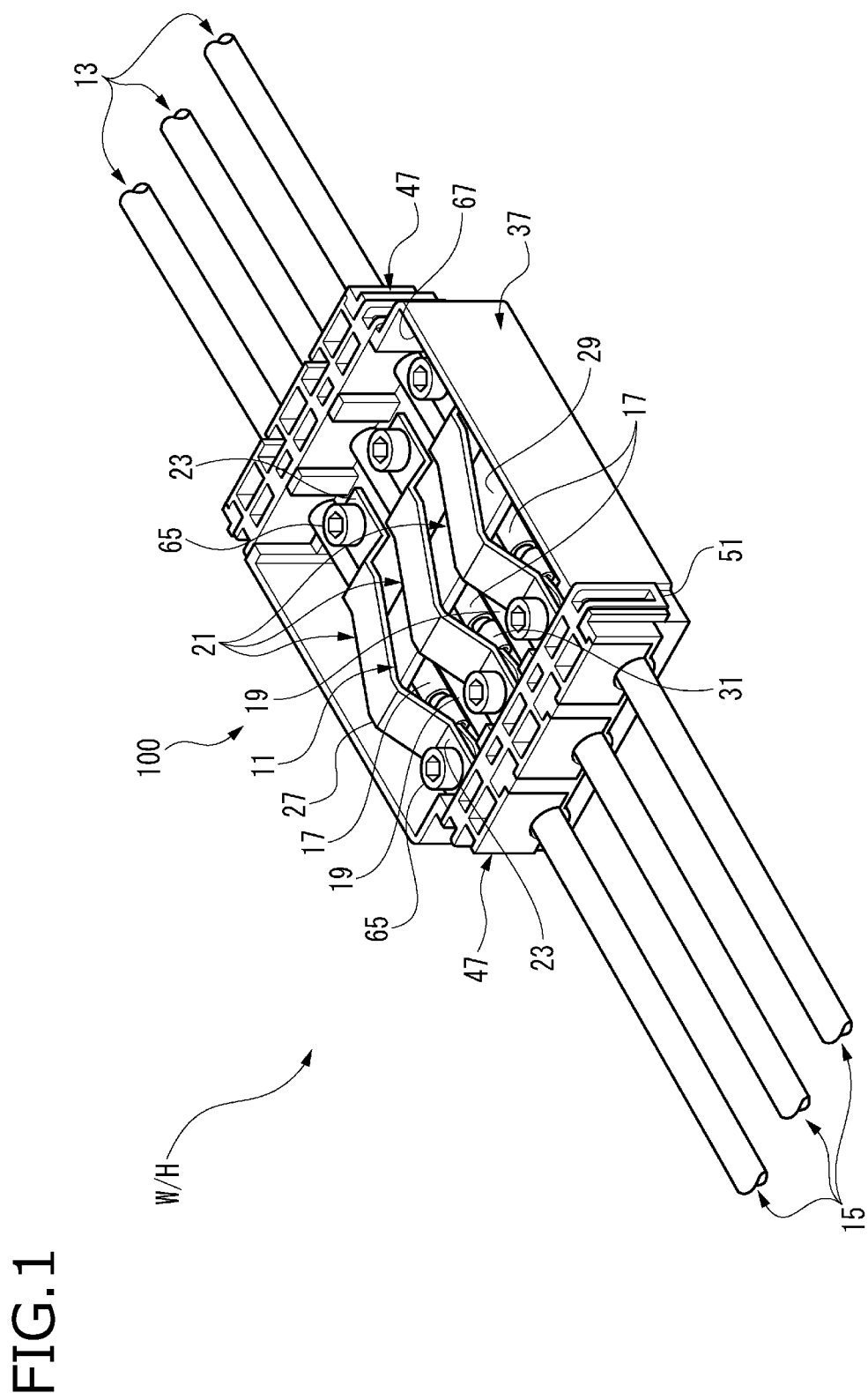
FIG. 1 is a perspective view of an essential part of a wire harness that is equipped with a noise reduction unit having a wire connection structure according to a first embodiment of the present invention.

FIG. 1 is a perspective view of an essential part of a wire harness W/H which is equipped with a noise reduction unit 100 having a wire connection structure according to a first embodiment of the invention.

The wire connection structure according to the first embodiment can be used suitably in, for example, the noise reduction unit 100 for a vehicle. The noise reduction unit 100 is provided in the wire harness W/H which connects a first device (e.g., inverter) and a second device (e.g., motor). The noise reduction unit 100 is equipped with a ring-shaped magnetic body 11, first wires 13, second wires 15, and plate-like busbars (conductive members) 21.

Figure 2:
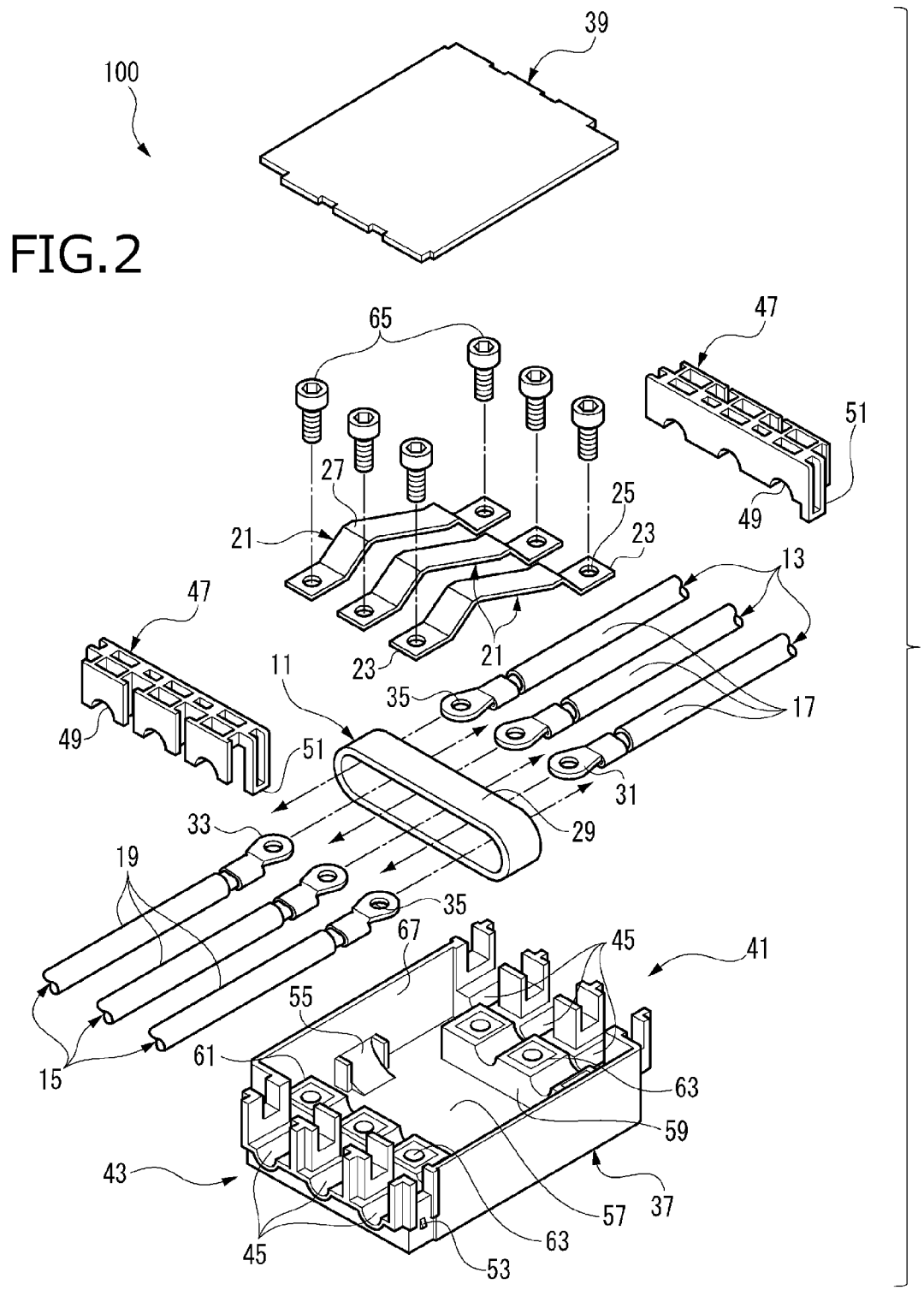
FIG. 2 is an exploded perspective view of the noise reduction unit shown in FIG. 1.

FIG. 2 is an exploded perspective view of the noise reduction unit 100 shown in FIG. 1. The ring-shaped magnetic body 11 employed in the first embodiment is made of ferrite, for example, and is shaped like a cylinder whose external shape in a cross section taken perpendicularly to the axial line assumes an ellipse having a large aspect ratio. The shorter inner diameter of the ring-shaped magnetic body 11 is set somewhat longer than the diameter of wires inserted through it. The longer inner diameter of the ring-shaped magnetic body 11 is long enough to accommodate six wires arranged in its major axis direction.

The shape and the size of the ring-shaped magnetic body employed in the invention are not limited to those of the ring-shaped magnetic body 11; it suffices that the ring-shaped magnetic body employed in the invention be shaped like a cylinder whose cross section has a longer inner diameter that is long enough to accommodate at least two wires. The wire connection structure according to the first embodiment is directed to a case that three pairs of wires (six wires in total) of the wire harness W/H are arranged in parallel in a plane and inserted through the ring-shaped magnetic body 11.

Figure 3A:
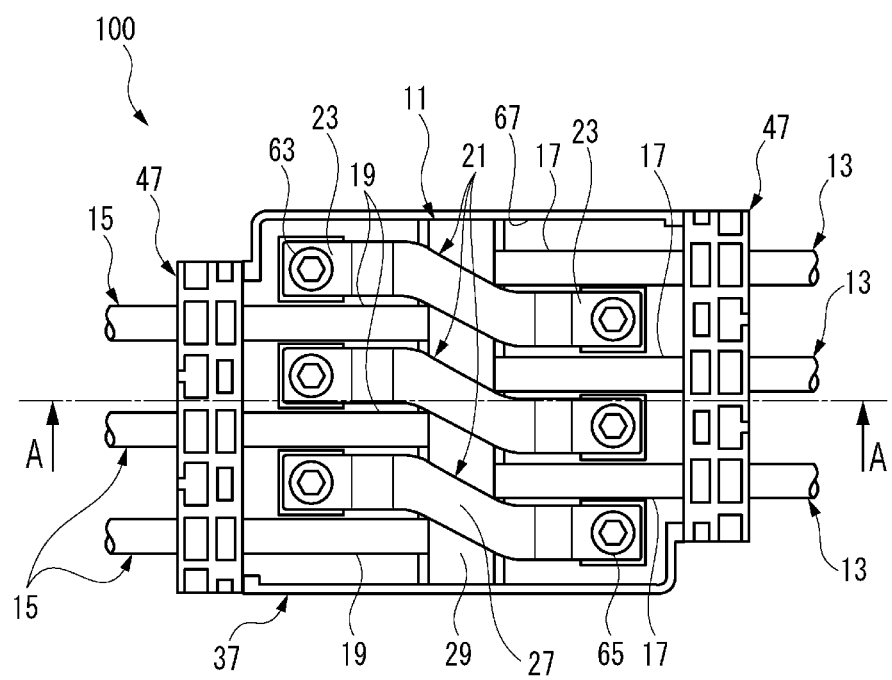
FIG. 3A is a plan view of the noise reduction unit shown in FIG. 1.
Figure 3B:
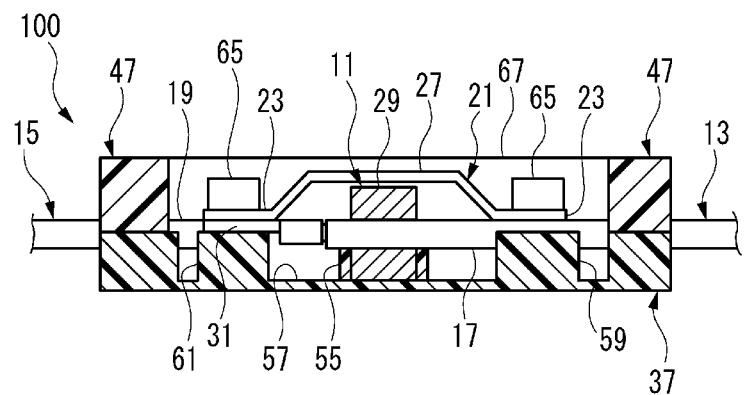
FIG. 3B is an A-A cross section of FIG. 3A.

FIG. 3A is a plan view of the noise reduction unit 100 shown in FIG. 1, and FIG. 3B is an A-A cross section of FIG. 3A.

The first wires 13 are connected to an inverter, for example. The first wires 13 have first wire end portions 17 respectively. In the first wire end portions 17, conductor ends of the first wires 13 are connected to first terminals 31 respectively. The first wire end portions 17 are inserted through the ring-shaped magnetic body 11. The second wires 15 are connected to a motor, for example. The second wires 15 have second wire end portions 19 respectively. In the second wire end portions 19, conductor ends of the second wires 15 are connected to second terminals 33, respectively. The second wire end portions 19 are inserted through the ring-shaped magnetic body 11 from the side opposite to the side from which the first wire end portions 17 are inserted. In the first embodiment, the first terminals 31 and the second terminals 33 are ring terminals. The first terminals 31 and the second terminals 33 have respective bolt insertion holes 35.

In the wire harness W/H, one first wire 13 and one second wire 15 constitute a pair of wires. The first wire end portion 17 of a first wire 13 and the second wire end portion 19 of a second wire 15 that constitute a pair of wires are set adjacent to each other and inserted through the ring-shaped magnetic body 11 from the opposite directions. The first wire end portions 17 and the second wire end portions 19 that constitute three pairs of wires are inserted through the ring-shaped magnetic body 11. That is, the three first wire end portions 17 that are spaced from each other are inserted through the ring-shaped magnetic body 11. And the three second wire end portions 19 are inserted through the ring-shaped magnetic body 11 from the side opposite to the side from which the first wire end portions 17 are inserted in such a manner that that the first wire end portions 17 and the second wire end portions 19 are arranged alternately. In this manner, the six wire terminal portions are inserted straightly through the ring-shaped magnetic body 11.

As described above, in the first embodiment, a total of six wire terminal portions (three first wire end portions 17 and three second wire end portions 19) are inserted through the ring-shaped magnetic body 11. All of the first wire end portions 17 and the second wire end portions 19 are arranged in one row in the inside space of the ring-shaped magnetic body 11. The ring-shaped magnetic body 11 has such an optimum core shape as to be able to accommodate the six wire terminal portions at a high density (i.e., the shorter inner diameter is approximately equal to the diameter of each wire terminal portion and the longer inner diameter is approximately equal to six times the diameter of each wire terminal portion). As such, the noise reduction unit 100 having the wire connection structure according to the first embodiment enables reduction in height and size.

The busbars 21 are disposed outside the ring-shaped magnetic body 11. Each busbar 21 is a conductive member that electrically connects the conductor of a first wire end portion 17 and the conductor of a second wire end portion 19.

Figure 4:
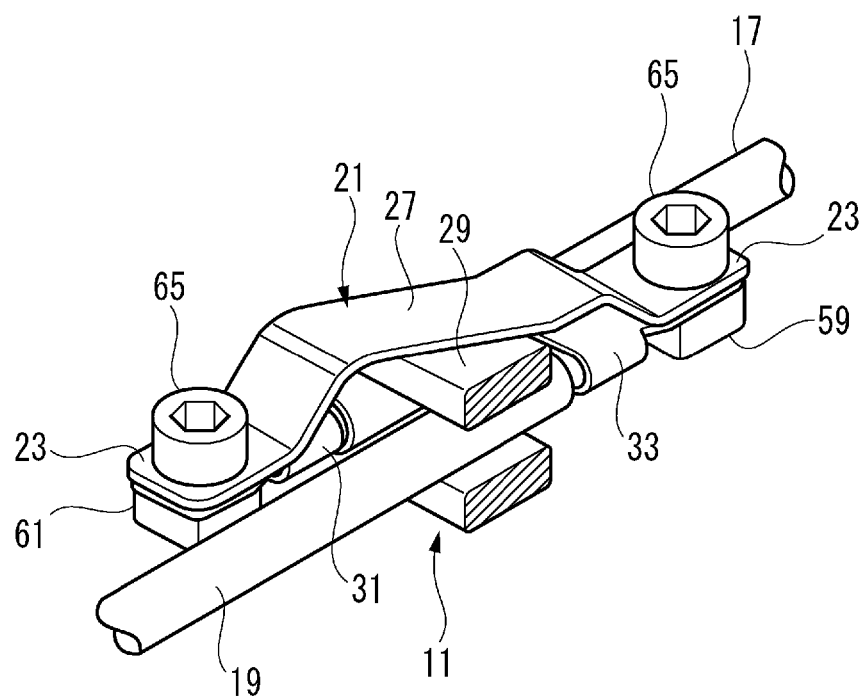
FIG. 4 is an enlarged perspective view of an essential part of FIG. 1.

FIG. 4 is an enlarged view of an essential part of the noise reduction unit 100 shown in FIG. 1. Each of the plate-like busbars 21 employed in the first embodiment is given a three-dimensional shape by performing sheet metal working on a strip-shaped conductive metal plate. Each busbar 21 has, at the two respective ends, rectangular bolt fastening plate portions 23 which exist in the same plane. Bolt fastening holes 25 are formed through the respective bolt fastening plate portions 23. The two bolt fastening plate portions 23 are spaced from each other in the longitudinal direction of the busbar 21 and deviated perpendicularly to the longitudinal direction in the same plane. The deviation between the two bolt fastening plate portions 23 is equal to the deviation between a first wire end portion 17 and a second wire end portion 19 that are adjacent to each other.

The two bolt fastening plate portions 23 of each busbar 21 are linked by a mountain-shaped connection portion. The mountain-shaped connection portion is formed by bending a strip-shaped conductive metal plate into a trapezoidal shape with its central portion made a link portion 27, and two foot portions of the mountain-shaped connection portion are connected to the respective bolt fastening plate portions 23. The link portion 27 of each busbar is located above the bolt fastening plate portions 23, whereby the mountain-shaped (i.e., trapezoidal) connection portion strides an upper half-ring portion 29 of the ring-shaped magnetic body 11 to allow the two bolt fastening plate portions 23 to connect to the associated first wire end portion 17 and second wire end portion 19, respectively.

Each busbar 21 may be connected to the associated first wire end portion 17 and second wire end portion 19 by a method other than bolt fastening, such as welding or crimping. As such, each busbar 21 is a conductive member that is disposed outside the ring-shaped magnetic body 11 and whose two end portions are electrically connected to the conductors of the associated first wire end portion 17 and second wire end portion 19, respectively.

The ring-shaped magnetic body 11 is housed in a housing 37 that is made of an insulative synthetic resin. The housing 37 is shaped like a cuboid, and its inside housing space is exposed by a top opening. The housing space, housing the ring-shaped magnetic body 11, the busbars 21, etc., of the housing 37 can be closed up tightly by attaching a lid 39 to its top edges.

As shown in FIG. 2, two shorter side walls, opposed to each other, of the housing 37 are formed with a first wire insertion portion 41 and a second wire insertion portion 43, respectively. Each of the first wire insertion portion 41 and the second wire insertion portion 43 has three wire insertion grooves 45. The first wire end portions 17 are inserted through the respective wire insertion grooves 45 of the first wire insertion portion 41. And the second wire end portions 19 are inserted through the respective wire insertion grooves 45 of the second wire insertion portion 43.

The wire insertion grooves 45 of the first wire insertion portion 41 are deviated from those of the second wire insertion portion 43 by the diameter of the wires. That is, the first wire end portions 17 which are inserted through the respective wire insertion grooves 45 of the first wire insertion portion 41 are deviated by the diameter of the wires from the wire insertion grooves 45 of the second wire insertion portion 43 which is formed in the shorter side wall which is opposed to the shorter side wall that is formed with the first wire insertion portion 41. The six wire terminal portions that are inserted through the ring-shaped magnetic body 11, that is, the three first wire end portions 17 and the three second wire end portions 19, go out of the housing 37 through the first wire insertion portion 41 and the second wire insertion portion 43.

Wire fixing members 47 are attached to the first wire insertion portion 41 and the second wire insertion portion 43, respectively. Each wire fixing member 47 is formed with three semicylindrical wire holding recesses 49 which are fitted with approximately top half portions the wires inserted through the wire insertion grooves 45, respectively. Each wire holding recess 49 and the wire insertion groove 45 opposed to it define a circular opening. Each wire fixing member 47 has lock portions 51 at the two respective ends. The lock portions 51 are locked on the respective lock nails 53 which project from two end portions of the associated one of the two shorter side walls of the housing 37, whereby the wire holding recesses 49 of the wire fixing member 47 hold the wires inserted through the wire insertion grooves 45, respectively.

Furthermore, the inside surfaces of two longer side walls of the housing 37 are formed with magnetic body holding portions 55, respectively. Two end portions, in the major axis direction, of the ring-shaped magnetic body 11 are fitted in the respective magnetic body holding portions 55, whereby the ring-shaped magnetic body 11 is positioned. The ring-shaped magnetic body 11 is positioned by the magnetic body holding portions 55 and held by a holding portion or the like (not shown) of the lid 39 in the minor axis direction, and is thereby held by the housing 37 without play.

Still further, in the housing 37, a second terminal fixing stage 59 is formed on a bottom portion 57 in the vicinity of one shorter side wall and a first terminal fixing stage 61 is formed on the bottom portion 57 in the vicinity of the other shorter side wall. The second terminal fixing stage 59 has three terminal fixing portions 63 on the lines of extension of the second wires 15, respectively. The first terminal fixing stage 61 has three terminal fixing portions 63 on the lines of extension of the first wires 13, respectively. The terminal fixing portions 63 of the second terminal fixing stage 59 are located on extensions of the second wire end portions 19 inserted through the second wire insertion portion 43, respectively. Likewise, the terminal fixing portions 63 of the first terminal fixing stage 61 are located on extensions of the first wire end portions 17 inserted through the first wire insertion portion 41, respectively.

An insert nut is buried and a bolt hole is formed in each terminal fixing portion 63 on the side that is opposed to the top opening of the housing 37. For example, the insert nuts are formed together with the housing 37 by insert molding when the housing 37 is molded.

The other bolt fastening plate portions 23 of the busbars 21 and the first terminals 31 are fastened to the terminal fixing portions 63 of the first terminal fixing stage 61 by bolts 65, respectively. The one bolt fastening plate portions 23 of the busbars 21 and the second terminals 33 are fastened to the terminal fixing portions 63 of the second terminal fixing stage 59 by bolts 65, respectively. That is, the first terminals 31 and the second terminals 33 are bolt-fastened to the bolt fastening plate portions 23 of the busbars 21, respectively, as a result of fastening, to the insert nuts, of the bolts 65 that are inserted through the bolt fastening plate portions 23, respectively. In this manner, in the wire connection structure of the noise reduction unit 100 according to the embodiment, the first terminals 31 are electrically connected to the corresponding second terminals 33 by the respective busbars 21 in such a manner as to be positioned with respect to and held indirectly by the bottom portions 57 of the housing 37 having the top opening 67.

Figure 5A:
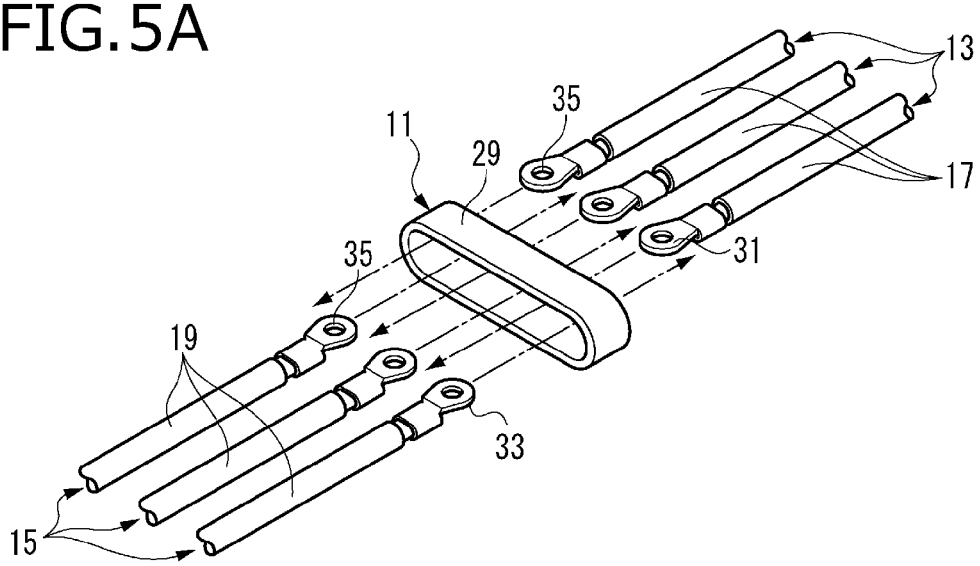
FIGS. 5A-5C are rough perspective views illustrating an assembling procedure of the noise reduction unit shown in FIG. 1.
Figure 5B:
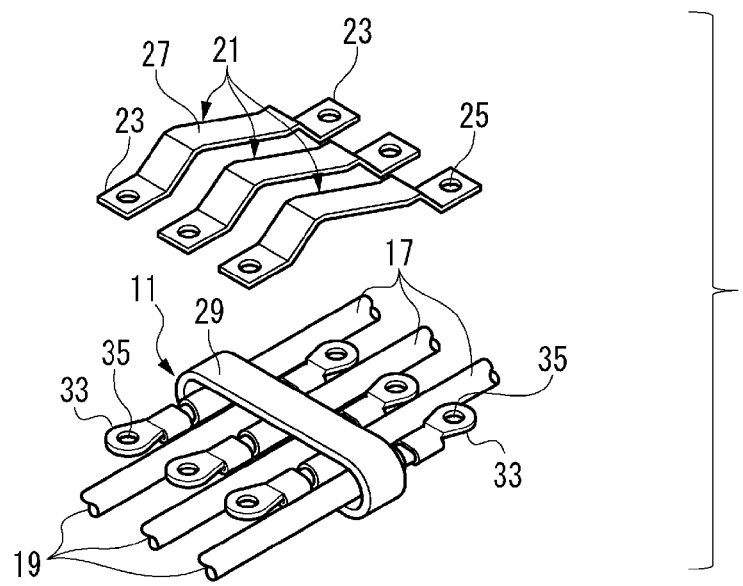
Figure 5C:
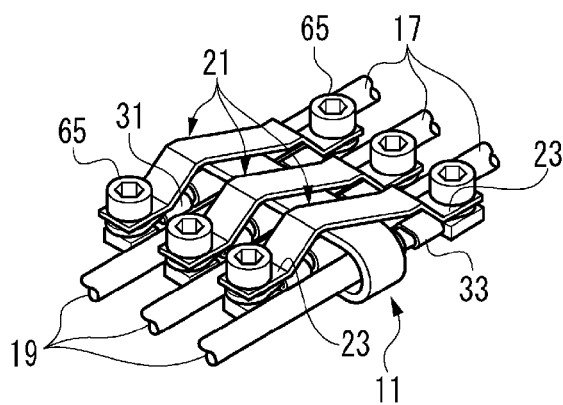

FIGS. 5A-5C are rough perspective views illustrating an assembling procedure of the noise reduction unit 100 shown in FIG. 1.

To assemble the noise reduction unit 100 according to the first embodiment, first, as shown in FIG. 5A, the first wire end portions 17 of the three first wires 13 are inserted through the ring-shaped magnetic body 11 from its one opening (in FIG. 5A, right-hand opening). Then the second wire end portions 19 of the three second wires 15 are inserted through the ring-shaped magnetic body 11 from its other opening so that the first wire end portions 17 and the second wire end portions 19 are arranged alternately.

Then, as shown in FIG. 5B, each first terminal 31 and each second terminal 33 that are adjacent to each other and constitute a pair of terminals are positioned by being mounted on terminal fixing portions 63 of the first terminal fixing stage 61 and the second terminal fixing stage 59 of the housing 37, respectively.

Then, as shown in FIG. 5C, each first terminal 31 and each second terminal 33 that constitute a pair of terminals are fixed to the respective terminal fixing portions 63 by bolts 65 together with the associated busbar 21 which strides the upper half-ring portion 29 of the ring-shaped magnetic body 11. In this manner, each first wire 13 and each second wire 15 that constitute a pair of wires are electrically connected to each other by a structure that includes the associated busbar 21 and is wound once around the upper half-ring portion 29 of the ring-shaped magnetic body 11.

Subsequently, the wire fixing portions 47 are attached to the first wire insertion portion 41 and the second wire insertion portion 43 of the housing 37, respectively, whereby the first wires 13 and the second wires 15 are fixed to the housing 37. Finally, sealing material (not shown) made of a synthetic resin such as an epoxy resin is charged into the housing 37 to which the ring-shaped magnetic body 11, the first wires 13, the second wires 15, and the busbars 21 are attached, whereby the assembling of the noise reduction unit 100 is completed. As a result, the ring-shaped magnetic body 11, the first terminals 31, the second terminals 33, and the busbars 21 are buried in the charged sealing material. By closing the top opening 67 of the housing 37 by the lid 39, the noise reduction unit 100 can be disposed outside a vehicle body.

As described above, in the noise reduction unit 100 according to the first embodiment, since sealing material is charged into the housing 37, the ring-shaped magnetic body 11 can be fixed reliably, it is not necessary to design a complex waterproof structure, and a small-size waterproof structure can be realized.

Next, a description will be made of advantages of the above-described noise reduction unit 100 having the wire connection structure according to the first embodiment.

In the noise reduction unit 100 according to the first embodiment, each first wire end portion 17 and each second wire end portion 19 that are inserted through the ring-shaped magnetic body 11 from the opposite directions are electrically connected to the bolt fastening plate portions 23 of the associated busbar 21 which is disposed outside the ring-shaped magnetic body 11, whereby the connection portion of the first wire 13 and the second wire 15 forms a coil-shaped circuit that is wound around the ring-shaped magnetic body 11. Thus, it is not necessary to bend the wires of the wire harness W/H to wind them around the ring-shaped magnetic body 11, which makes it possible to reduce the number of steps of the winding process and prevent the overall size of the noise reduction unit 100 from being increased because of a minimum wire bending radius. As a result, space saving and a high surge suppressing effect can be attained.

In a case that a noise reduction unit in which a coil is formed by winding a wire around a ring-shaped magnetic body is attached to a connection portion of each first wire 13 and each second wire 16 of a wire harness, it is necessary to connect the conductor of a first wire end portion 17 and the conductor of a second wire end portion 19 to the two ends of the wire that is wound around the ring-shaped magnetic body while strongly pressing the wire that tends to recover by springing-back, resulting in low efficiency of assembling work.

In contrast, in the noise reduction unit 100 according to the first embodiment, when the connection portion of each first wire 13 and each second wire 16 is wound around the ring-shaped magnetic body 11, none of the associated busbar 21, the first wire end portion 17, and the second wire end portion 19 are deformed. The efficiency of assembling work is high because it is not necessary to press the associated busbar 21, the first wire end portion 17, or the second wire end portion 19 strongly during connection work.

In the noise reduction unit 100 according to the first embodiment, since each first terminal 31 and each second terminal 33 are connected to the respective bolt fastening plate portions 23 of the associated busbar 21 by bolt fastening, high connection reliability can be attained even if the connection involves conductors that are different from each other in form and material. That is, high connection reliability can be attained even in the case where the conductors of each first terminal 31 and each second terminal 33 and the associated busbar 21 are made of different kinds of conductive materials such as an aluminum alloy and a copper alloy.

Since the first terminals 31 and the second terminals 33 are fastened to the first terminal fixing stage 61 and the second terminal fixing stage 59, respectively, fastening positions are determined easily to increase the efficiency of assembling work. As a result, the number of assembling steps of the noise reduction unit 100 can be reduced. Naturally, it goes without saying that in the invention the manner of electrical connection between the conductive member and the conductors of the first wire end portion and the second wire end portion is not limited to bolt fastening and may be any of other various connection methods such as welding and crimping.

In the noise reduction unit 100 according to the first embodiment, since the conductive members are the plate-like busbars 21, the distance, from the upper half-ring portion 29 of the ring-shaped magnetic body 11, of the portions, located outside it, of the busbars 21 can be minimized, whereby the overall noise reduction unit 100 can be made compact (reduced in height and size).

Since the first terminals 31 and the second terminals 33 are positioned with respect to and held directly by the first terminal fixing stage 61 and the second terminal fixing stage 59 (e.g., insert nuts) of the housing 37, respectively, the positions of the surfaces for holding the first terminals 31 and the second terminals 33 do not vary with respect to the bottom portion 57. This increases the efficiency of insertion work when the first wire end portions 17 and the second wire end portions 19 are inserted through the first wire insertion portion 41 and the second wire insertion portion 43 of the housing, respectively, and the first terminals 31 and the second terminals 33 are positioned with respect to and held indirectly by the bottom portion 57.

The connection portion of each first wire 13 and each second wire 15 which forms a coil-shaped circuit is housed in the housing 37 and sealed in by sealing material, which increases the waterproofness and impact resistance. As such, in particular, the noise reduction unit 100 allows the first wire end portions 17 and the second wire end portions 19 of a wire harness W/H (first wires 13 and second wires 15) routed outside a vehicle body to be housed in the housing 37 with necessary waterproofness and impact resistance.

Next, a noise reduction unit 200 having a wire connection structure according to a second embodiment of the invention will be described.

Figure 6:
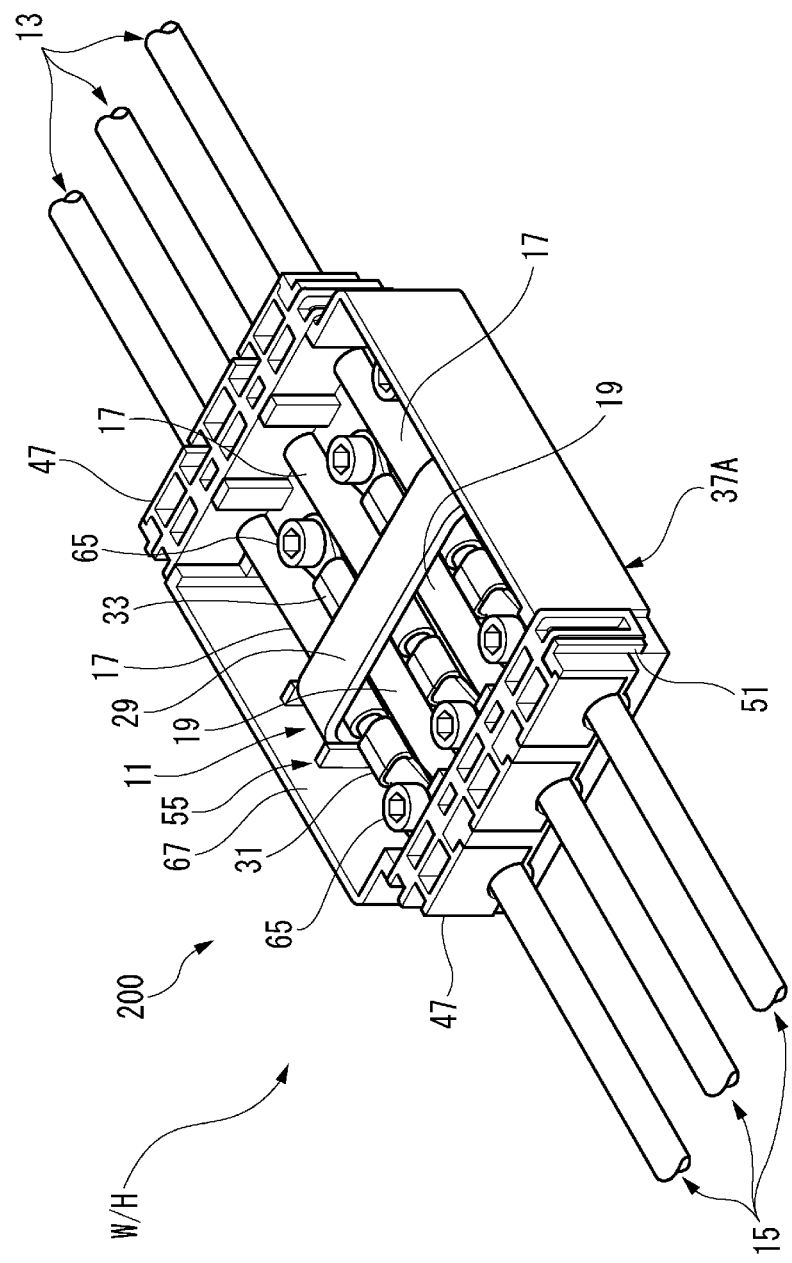
FIG. 6 is a perspective view of an essential part of a wire harness that is equipped with a noise reduction unit having a wire connection structure according to a second embodiment of the invention.
Figure 7:
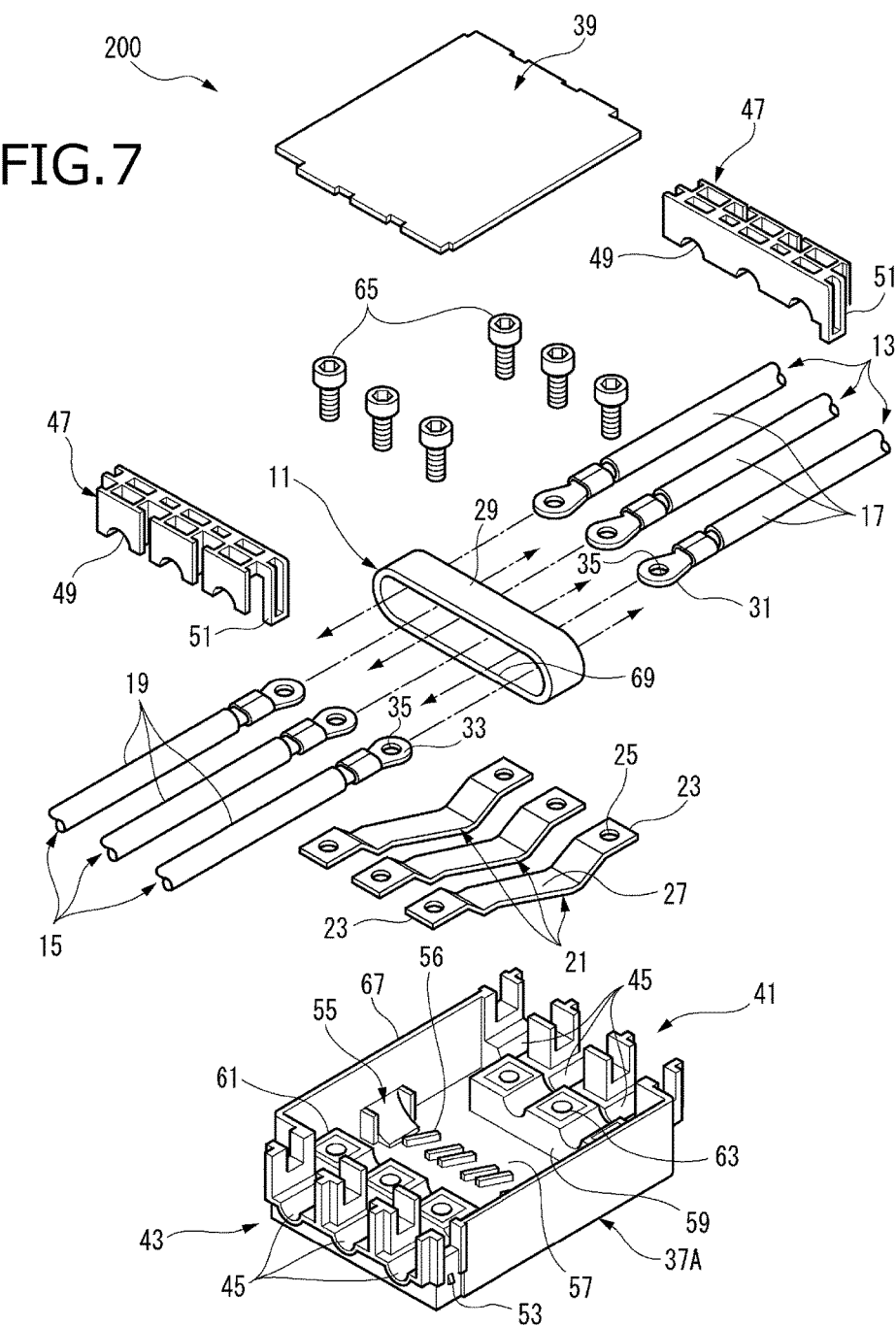
FIG. 7 is an exploded perspective view of the noise reduction unit shown in FIG. 6.

FIG. 6 is a perspective view of an essential part of a wire harness W/H which is equipped with the noise reduction unit 200 having the wire connection structure according to the second embodiment of the invention. FIG. 7 is an exploded perspective view of the noise reduction unit 200 shown in FIG. 6. In the following description of the second embodiment, constituent members having the same ones in the above-described noise reduction unit 100 according to the first embodiment will be given the same reference symbols as the latter and will not be described redundantly.

In the noise reduction unit 200, the position of the busbars 21 in the vertical direction is opposite to that in the noise reduction unit 100. More specifically, whereas in the noise reduction unit 100 the busbars 21 are fastened so as to stride the upper half-ring portion 29 of the ring-shaped magnetic body 11, in the noise reduction unit 200 the busbars 21 are fastened so as to stride a lower half-ring portion 69 of the ring-shaped magnetic body 11. The other part of the configuration of the noise reduction unit 200 is the same as that of the noise reduction unit 100.

Figure 8A:
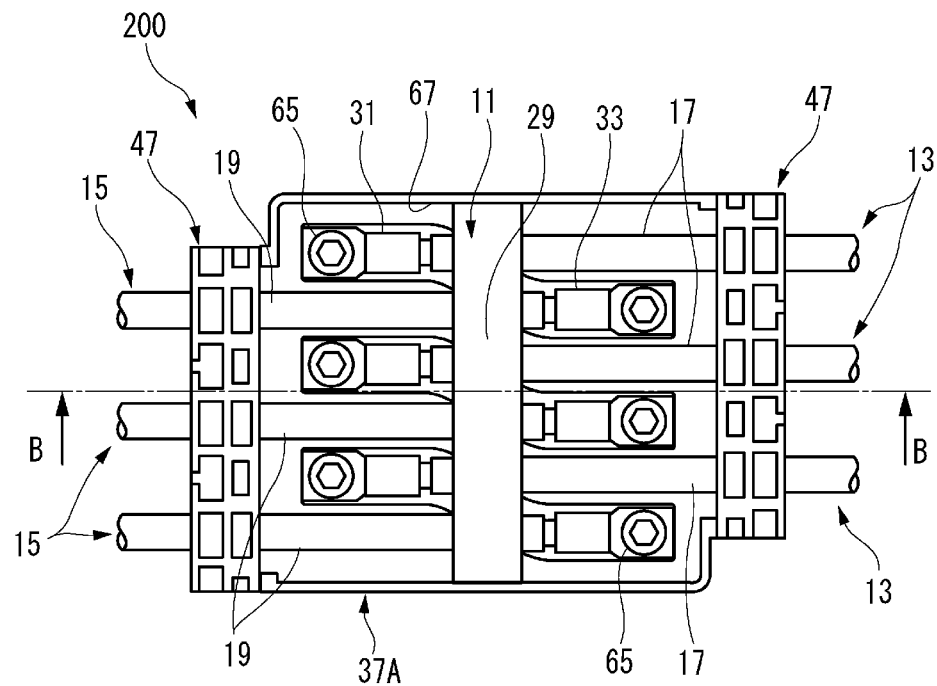
FIG. 8A is a plan view of the noise reduction unit shown in FIG. 6.
Figure 8B:
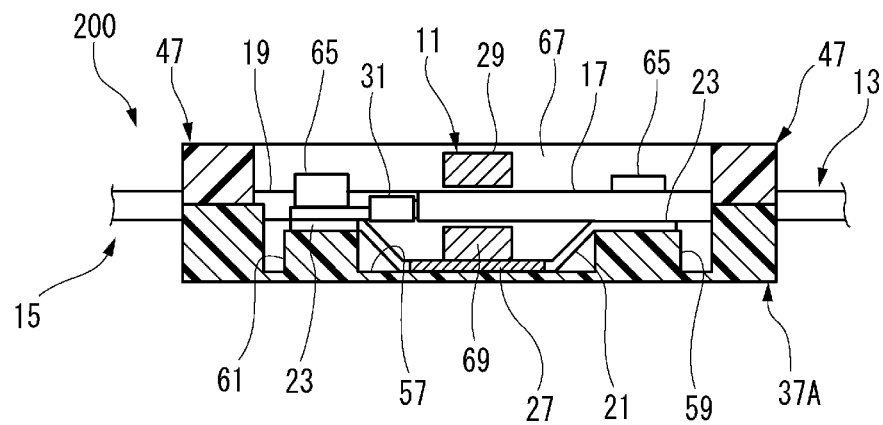
FIG. 8B is a B-B cross section of FIG. 8A.

FIG. 8A is a plan view of the noise reduction unit 200 shown in FIG. 6, and FIG. 8B is a B-B cross section of FIG. 8A. In the wire connection structure of the noise reduction unit 200 according to the second embodiment, the busbars 21 are disposed in such a manner as to be positioned with respect to and held by a bottom portion 57 of a housing 37A having a top opening 67.

In the housing 37A, a first terminal fixing stage 61 and a second terminal fixing stage 59 project from the bottom portion 57. Thus, a busbar housing space capable of housing link portions 27 of the busbars 21 is secured between the first terminal fixing stage 61 and the second terminal fixing stage 59. Furthermore, plural positioning ribs 56 for positioning the busbars 21 project from a part, corresponding to the busbar housing space, of the bottom portion 57. Bolt fastening plate portions 23 (sets of two end portions) of the busbars 21 are mounted on the terminal fixing portions 63 of the first terminal fixing stage 61 and the second terminal fixing stage 59 and the link portions 27 are housed in the busbar housing space in such a manner that each link portion 27 is disposed between the associated the positioning ribs 56. In this manner, in the noise reduction unit 200, the busbars 21 are housed under the ring-shaped magnetic body 11 so as to be oriented reversely in the vertical direction to those of the noise reduction unit 100.

To assemble the noise reduction unit 200 according to the second embodiment, first, each busbar 21 is placed on the associated terminal fixing portions 63 of the first terminal fixing stage 61 and the second terminal fixing stage 59. Each busbar 21 is disposed in such a manner that the link portion 27 which is set between the associated positioning ribs 56 project downward and the bolt fastening plate portions 23 as the two end portions are placed on the respective terminal fixing portions 63. Then the ring-shaped magnetic body 11 is attached to the housing 37A so as to be placed on the busbars 21.

Then the three first wires 13 are inserted through the respective wire insertion grooves 45 of the housing 37A. The first wire end portions 17 of the three first wires 13 are inserted through the ring-shaped magnetic body 11 from its one opening. Then the three second wires 15 are inserted through the respective opposite wire insertion grooves 45 of the housing 37A. The second wire end portions 19 of the three second wires 15 are inserted through the ring-shaped magnetic body 11 from its other opening so that the first wire end portions 17 and the second wire end portions 19 are arranged alternately.

Then each first terminal 31 and each second terminal 33 that are adjacent to each other and constitute a pair of terminals are placed on the bolt fastening plate portions 23, placed on the first terminal fixing stage 61 and the second terminal fixing stage 59, respectively, of the associated busbar 23. Each first terminal 31 and each second terminal 33 that constitute a pair of terminals are then fixed to the respective terminal fixing portions 63 by bolts 65 together with the associated busbar 21. In this manner, each first wire end portion 17 and each second wire end portion 19 that constitute a pair of wire terminal portions are electrically connected to each other so as to form a structure that is wound once around the lower half-ring portion 69 of the ring-shaped magnetic body 11.

Subsequently, wire fixing portions 47 are attached to the first wire insertion portion 41 and the second wire insertion portion 43 of the housing 37A, respectively, whereby the first wires 13 and the second wires 15 are fixed to the housing 37A. Finally, sealing material (not shown) is charged into the housing 37A and the top opening 67 of the housing 37A is closed by a lid 39, whereby the assembling of the noise reduction unit 200 is completed.

Next, a description will be made of advantages of the above-described noise reduction unit 200 having the wire connection structure according to the second embodiment.

In the noise reduction unit 200 according to the second embodiment, since the conductive members are the plate-like busbars 21, the distance, from the lower half-ring portion 69 of the ring-shaped magnetic body 11, of the portions, located outside it, of the busbars 21 can be minimized, whereby the overall noise reduction unit 200 can be made compact.

In the noise reduction unit 200, since the conductors of each first wire end portion 17 and each second wire end portion 19 that constitute a pair of wire terminal portions are connected to the bolt fastening plate portions 23 of the associated busbar 21 which is positioned with respect to and held by the bottom portion 57 of the housing 37A, it is not necessary to press the busbars 21 during connection work and hence the efficiency of assembling work is increased.

Next, a noise reduction unit 300 having a wire connection structure according to a third embodiment of the invention will be described.

FIG. 9 is an exploded perspective view of the noise reduction unit 300 having the wire connection structure according to the third embodiment of the invention. In the following description of the third embodiment, constituent members having the same ones in the above-described noise reduction unit 100 according to the first embodiment will be given the same reference symbols as the latter and will not be described redundantly.

In the noise reduction unit 300, a ring-shaped magnetic body 11, first wire end portions 17, second wire end portions 19, and terminal-integrated connection wires (conductive members) 75 are housed in a housing 71 and sealed in by sealing material (not shown).

Each terminal-integrated connection wire 75 is formed by crimping bolt fastening terminals 73 which are LA terminals onto portions, exposed at the two respective ends, of the conductor of a covered wire. That is, in the noise reduction unit 300, the terminal-integrated connection wires 75 are employed as the conductive members. Since the portion, between the bolt fastening terminals 73 located at the two respective ends, of each terminal-integrated connection wire 75 is a covered wire, the terminal-integrated connection wire 75 can be bent more easily and hence attached more easily than the above-described busbars 21.

The housing 71 employed in the third embodiment is approximately shaped like a long, bottom-closed cylinder. The housing 71 has wire insertion portions 77 at the two respective ends in the longitudinal direction. Each wire insertion portion 77 has three wire insertion holes 46 (through-holes), and is formed with a cylindrical packing holding portion 79 which surrounds the wire insertion holes 46.

A packing 81 which has three wire insertion holes 83 and is made of an elastic material such as rubber is attached to each wire insertion portion 77. The wire insertion holes 83 are in watertight contact with the outer circumferences of first wires 13 or second wires 15, respectively. The packing 71 through which the three first wires 13 are inserted and the packing 71 through which the three second wires 15 are inserted are attached to the two respective wire insertion portions 77 of the housing 71. Each packing 81 establishes watertight sealing between the associated wire insertion portion 77 and the first wires 13 or the second wires 15.

In the housing 71, holding pins 87 for holding the ring-shaped magnetic body 11 are erected from a bottom portion 57. Fixing flanges 89 through which the respective holding pins 87 are to penetrate are attached to the ring-shaped magnetic body 11. The holding pins 87 penetrate through the respective fixing flanges 89, whereby the ring-shaped magnetic body 11 is positioned at a prescribed position with respect to the bottom portion 57.

A second terminal fixing stage 91 and a first terminal fixing stage 93 are placed on the bottom portion 57 of the housing 71. The second terminal fixing stage 91 has three terminal fixing portions 63 which are arranged in the same direction as the arrangement direction of the second wire end portions 19. The first terminal fixing stage 93 has three terminal fixing portions 63 which are arranged in the same direction as the arrangement direction of the first wire end portions 17. The terminal fixing portions 63 of the second terminal fixing stage 91 are located over extensions of the second wire end portions 19, respectively, which are inserted through the respective wire insertion holes 83 of the associated packing 81. Likewise, the terminal fixing portions 63 of the first terminal fixing stage 93 are located over extensions of the first wire end portions 17, respectively, which are inserted through the respective wire insertion holes 83 of the associated packing 81.

An insert nut is buried and a bolt hole is formed in each terminal fixing portion 63 on the side that is opposed to the top opening of the housing 37. For example, the insert nuts are formed together with the first terminal fixing stage 93 or the second terminal fixing stage 91 by insert molding when the latter is molded.

FIGS. 10A-10D are rough perspective views illustrating an assembling procedure of the noise reduction unit 300 shown in FIG. 9.

To assemble the noise reduction unit 300 according to the third embodiment, first, the ring-shaped magnetic body 11 is placed on the bottom portion 57 of the housing 71. The ring-shaped magnetic body 11 is positioned by causing the holding pins 87 to penetrate through the respective fixing flanges 89 which are attached to the ring-shaped magnetic body 11.

The three first wires 13 are inserted into the one packing 81 in advance, and the three second wires 15 are inserted into the other packing 81 in advance. First terminals 31 and second terminals 33 are connected to the tips of the first wires 13 and the tips of the second wires 15, respectively.

Subsequently, the three first wire end portions 17 are inserted through the one wire insertion holes 46 and the packing 81 is fitted into the associated packing holding portion 79. Likewise, the three second wire end portions 19 are inserted through the other wire insertion holes 46 and the packing 81 is fitted into the associated packing holding portion 79.

Figure 10A:
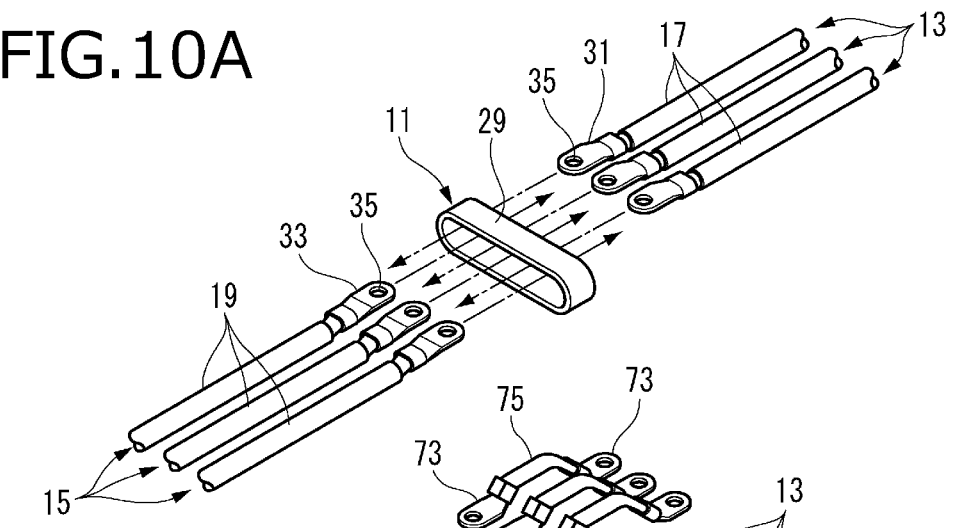
FIGS. 10A-10D are rough perspective views illustrating an assembling procedure of the noise reduction unit shown in FIG. 9.
Figure 10B:
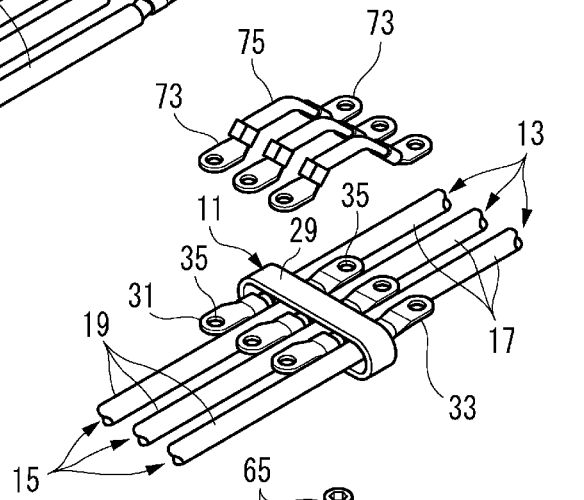

At the same time, as shown in FIGS. 10A and 10B, the three first wire end portions 17 are inserted through the ring-shaped magnetic body 11 (placed on the bottom portion 57 of the housing 71) from its one opening. And the second wire end portions 19 are inserted through the ring-shaped magnetic body 11 from its other opening so that the first wire end portion 17 and the second wire end portion 19 are arranged alternately.

Figure 10C:
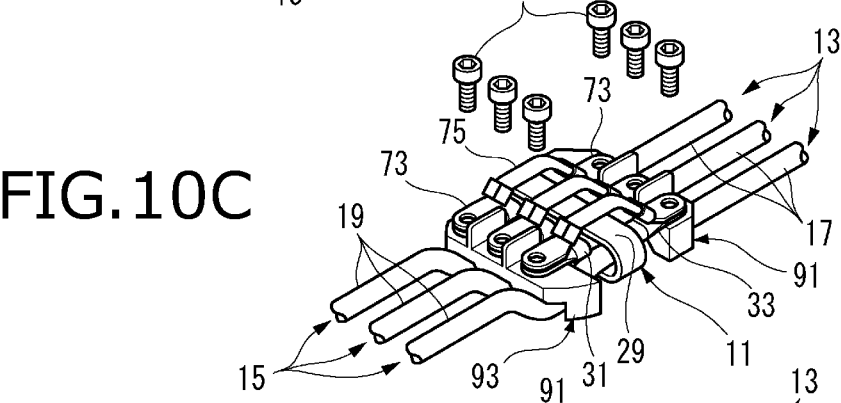

Then, as shown in FIG. 10C, the second terminal fixing stage 91 and the first terminal fixing stage 93 are placed on the bottom portion 57 with the ring-shaped magnetic body 11 interposed between them. The second wire end portions 19 are held between the first terminal fixing stage 93 and the bottom portion 57, and the first wire end portion 17 are held between the second terminal fixing stage 91 and the bottom portion 57. Each first terminal 31 and each second terminal 33 that are adjacent to each other and constitute a pair of terminals (three pairs in total) are positioned as a result of being placed on the associated terminal fixing portions 63 of the first terminal fixing stage 93 and the second terminal fixing stage 91 which are placed on the bottom portion 57, respectively.

Figure 10D:
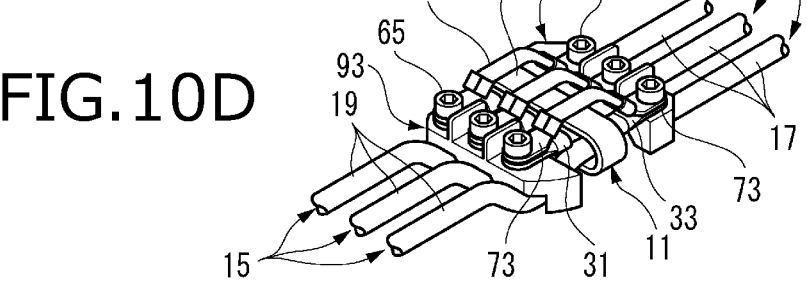
Figure 11:
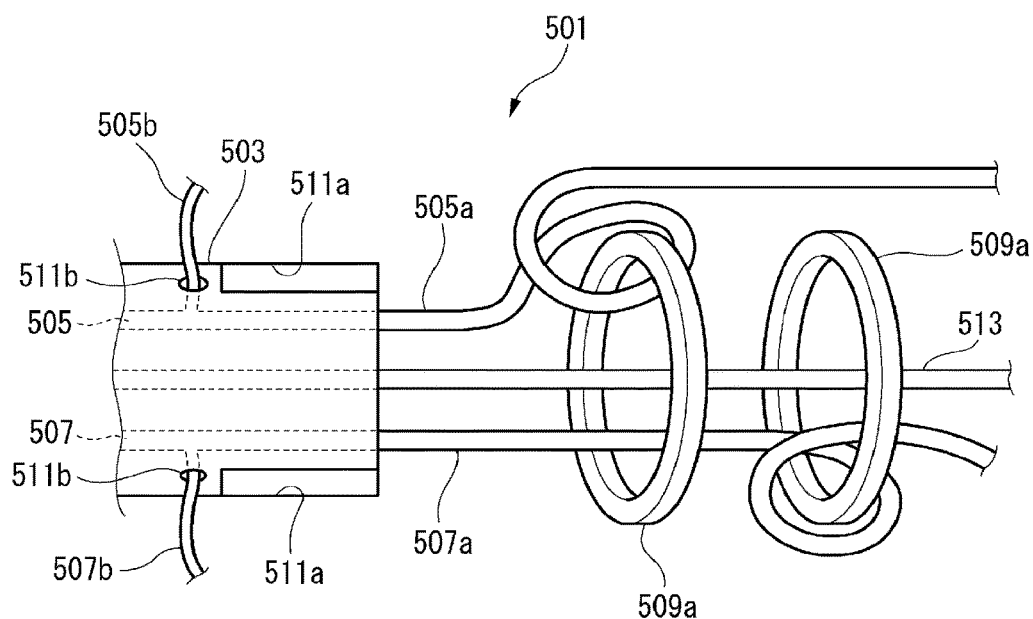
FIG. 11 is a schematic view of a connector device having a conventional wire connection structure.

Then, as shown in FIG. 10D, each first terminal 31 and each second terminal 33 that constitute a pair of terminals are fixed to the associated terminal fixing portions 63 by bolts 65 together with the bolt fastening terminals 73 of the associated terminal-integrated connection wire 75 which strides the upper half-ring portion 29 of the ring-shaped magnetic body 11. As a result, each first terminal 31 and each second terminal 33 that constitute a pair of terminals are electrically connected to each other by a structure that includes the associated terminal-integrated connection wire 75 and is wound once around the upper half-ring portion 29 of the ring-shaped magnetic body 11.

Subsequently, sealing material (not shown) is charged into the housing 71. As a result, the ring-shaped magnetic body 11, the first terminal fixing stage 93, the second terminal fixing stage 91, the first terminals 31, the second terminals 33, and the terminal-integrated connection wires 75 are buried in the sealing material thus charged. After solidification of the sealing material, the top opening 67 of the housing 71 is closed by a lid 95, whereby the assembling of the noise reduction unit 300 is completed.

Next, a description will be made of advantages of the above-described noise reduction unit 300 having the wire connection structure according to the third embodiment.

In the noise reduction unit 300 according to the third embodiment, by charging sealing material into the housing 71, the ring-shaped magnetic body 11, the first terminal fixing stage 93, and the second terminal fixing stage 91 which are merely placed on the bottom portion 57 can be fixed to the housing 71 reliably so as to form an integral body. Thus, without the need for being provided with complex fixing structures, the housing 71 can be simplified in shape.

Each terminal-integrated connection wire 75 is formed by crimping LA terminals onto portions, exposed at the two respective ends, of the conductor of a covered wire. As a result, the terminal-integrated connection wires 75 can be bent more easily and hence can be attached more easily than the busbars 21. Since each terminal-integrated connection wire 75 is composed of LA terminals and a covered wire which is highly versatile, its manufacturing cost can be made low.

The invention is not limited to the above embodiments. The invention expects that those skilled in the art will be able to combine elements of the embodiments or make changes or conceive applications on the basis of this specification and known techniques, and such changes, modifications, etc. are included in the scope of protection.

For example, although the embodiments are directed to the case that the wire harness W/H is provided with three pairs of wires, each pair consisting of a first wire 13 and a second wire 15, the same advantages as described above are provided even in the case of a wire harness that is provided with one pair or two pairs of wires or four or more pairs of wires. Although the embodiments are directed to the case that the housing 37, 37A, or 71 is provided with the lid 39 or 95, in the wire connection structure according to the invention the lid can be omitted in the case where sealing material is charged into the housing. This makes it possible to reduce the number of components and thereby make the housing structure even simpler.

As seen from the above description, the above-described wire connection structures, noise reduction units, and wire harnesses according to the embodiments can reduce the number of steps of a winding process, does not cause a size increase of cores around which wires are wound, and can provide a high surge suppressing effect.

The features of the above-described wire connection structures, noise reduction units, and wire harnesses according to the embodiments of the invention will be summarized below concisely in the form of items [1] to [6]:

[1] A wire connection structure comprising:
a ring-shaped magnetic body (11);
a first wire (13) having a first wire end portion (17) which is inserted through the ring-shaped magnetic body from a first direction;
a second wire (15) having a second wire end portion (19) which is inserted through the ring-shaped magnetic body from a second direction opposite to the first direction; and
a conductive member (busbar 21, terminal-integrated connection wire 75) which is disposed outside the ring-shaped magnetic body and has two end portions that are electrically connected to a conductor of the first wire end portion and a conductor of the second wire end portion respectively.

[2] The wire connection structure according to item [1], further comprising:
a first terminal (31) that is connected to the conductor of the first wire end portion (17); and
a second terminal (33) that is connected to the conductor of the second wire end portion (19),
wherein the first terminal (31) and the second terminal (33) are fastened to the two end portions of the conductive member (busbar 21, terminal-integrated connection wire 75) respectively with bolts.

[3] A noise reduction unit (100, 200, 300) comprising:
the wire connection structure according to item [2]; and
a housing (37, 37A, 71),
wherein the ring-shaped magnetic body (11), the first wire end portion (17), the second wire end portion (19), and the conductive member (busbar 21, terminal-integrated connection wire 75) are housed in the housing (37, 37A, 71) and sealed in by sealing material.

[4] The noise reduction unit (100) according to item [3], wherein the conductive member is a busbar (21);
wherein the first terminal (31) and the second terminal (33) that are positioned with respect to and held by a bottom portion (57) of the housing (37) having a top opening (67) are electrically connected to each other by the busbar.

[5] The noise reduction unit according to item [3], wherein the conductive member is a busbar (21) and is positioned and held by a bottom portion (positioning ribs 56) of the housing (37A) having a top opening (67).

[6] A wire harness (W/H) comprising the noise reduction unit (100, 200, 300) according to any one of items [3] to [5].

What is claimed is:

1. A wire connection structure comprising:
a ring-shaped magnetic body;
a first wire having a first wire end portion which is inserted through the ring-shaped magnetic body from a first direction;
a second wire having a second wire end portion which is inserted through the ring-shaped magnetic body from a second direction opposite to the first direction; and
a conductive member which is disposed outside the ring-shaped magnetic body and has two end portions that are electrically connected to a conductor of the first wire end portion and a conductor of the second wire end portion respectively,
wherein the first wire end portion and the second wire portion together form a coil-shaped circuit with the conductive member that is wound around the ring-shaped magnetic body without the first wire end portion and the second wire portion being wound around the ring-shaped magnetic body.

2. The wire connection structure according to claim 1, further comprising:
a first terminal that is connected to the conductor of the first wire end portion; and
a second terminal that is connected to the conductor of the second wire end portion,
wherein the first terminal and the second terminal are fastened to the two end portions of the conductive member respectively with bolts.

3. A noise reduction unit comprising:
the wire connection structure according to claim 2; and
a housing,
wherein the ring-shaped magnetic body, the first wire end portion, the second wire end portion, and the conductive member are housed in the housing and sealed in by sealing material.

4. The noise reduction unit according to claim 3, wherein the conductive member is a busbar;
wherein the first terminal and the second terminal are positioned and held by a bottom portion of the housing having a top opening; and
wherein the first terminal and the second terminal are electrically connected to each other by the busbar.

5. The noise reduction unit according to claim 3, wherein the conductive member is a busbar and is positioned and held by a bottom portion of the housing having a top opening.

6. A wire harness comprising:
the noise reduction unit according to claim 3.

7. The wire connection structure according to claim 1, wherein the ring-shaped magnetic body defines an upper half-ring portion and a lower half-ring portion, and the conductive member is wound once around at least one of the upper half-ring portion and the lower half-ring portion.

8. The wire connection structure according to claim 1, wherein the first wire end portion and the second wire end portion are electrically connected to each other through the conductive member.

* * * * *